United States Patent [19]

Galle et al.

[11] 3,958,016

[45] May 18, 1976

[54] METHOD OF HYDROPROCESSING WHEAT

[75] Inventors: Edward Louis Galle, St. Paul; Joseph Francis Kolosky; Joseph Leo Mayou, both of Minneapolis, all of Minn.

[73] Assignee: The Pillsbury Company, Minneapolis, Minn.

[22] Filed: Feb. 26, 1975

[21] Appl. No.: 553,379

[52] U.S. Cl............................... 426/61; 426/532; 426/33; 426/18; 426/627; 426/618
[51] Int. Cl.²................................................ A23L 1/00
[58] Field of Search................................ 426/18, 61

[56] References Cited
UNITED STATES PATENTS

| 3,788,861 | 1/1974 | Durst | 426/484 |
|---|---|---|---|
| 3,832,472 | 8/1974 | Rodgers et al. | 426/627 |
| 3,851,085 | 11/1974 | Rodgers et al. | 426/626 |

*Primary Examiner*—Raymond N. Jones
*Attorney, Agent, or Firm*—Michael D. Ellwein; Mart C. Matthews

[57] ABSTRACT

Disclosed herein is a method for processing wheat in an aqueous medium to separate the endosperm from the husk wherein the starch granules of the endosperm are maintained in an intact, ungelatinized form and the gluten protein of the endosperm is maintained in a dispersible and substantially undenatured state. The aqueous medium is innoculated with a harmless micro-organism which selectively grows in each of the processing steps and thereby excludes the growth of pathogenic organisms in the system. The endosperm obtained from this process can be used as a baking ingredient after concentration or drying or it can be separated into its starch and gluten components.

20 Claims, 1 Drawing Figure

METHOD OF HYDROPROCESSING WHEAT

BACKGROUND OF THE INVENTION

The present invention is directed primarily to a method for hydroprocessing wheat wherein a wheat product free of husk is obtained and wherein substantially all of the starch granules are maintained in an intact, ungelatinized form and the gluten protein is maintained in a dispersible and substantially undenatured state with respect to the doughing function.

A wheat kernel consists of three major components: the endosperm, the germ and the husk. The husk comprises the outer branny layers lying between and including the aleurone and pericarp tissues and envelopes the starchy endosperm (the source of white flour) and the germ. Although the aleurone, a dense layer of protein-rich, non-starchy cells, overlying the body of the starchy endosperm is technically of endospermal origin, it will be considered as part of the husk herein. In terms of the total weight of the wheat kernel, the husk typically comprises about 14.5%, the endosperm about 83% and the germ about 2.5%.

During conventional dry milling, wheat is ground and the husk, including the aleurone layer, and the germ are mechanically removed from the endosperm. The typical yield of white flour from a dry milling process is from 72% to 74% of the total weight of the wheat. This white flour contains some husk and germ fragments. A significant portion of the endosperm is removed with the husk and germ, thereby limiting the yield of white flour. When attempts are made to increase the yield of white flour, the percentage of husk, aleurone and germ in the flour is progressively increased.

The husk is removed during conventional dry milling because it is the primary source of color in flour, is deleterious to the function of the flour in some applications, and, in some circumstances, nutritionally injurious. The germ is removed to prevent rancid odors attending oxidation of the unsaturated fats contained in the germ.

The wheat flour, to be useful in baking leavened products such as breads and cakes, must support doughing function. In very general terms, doughing describes the phenomenon by which a loose mass of flour particles, when admixed with water, becomes a cohesive, resilient body of dough. As mixing is continued, a resiliently extensible matrix is formed which is capable of entrapping and retaining leavening gas bubbles and which forms an expanded structure which will persist through baking.

For several hundreds of years, dry milling was the only process for making flour from wheat. In more recent times, various techniques for wet milling have been tried with limited degrees of success. Methods for milling wheat and other grains using wet processing and milling techniques are illustrated in Bartmann, U.S. Pat. Nos. 1,670,015 and 1,670,016; De Sollano, et al, U.S. Pat. No. 2,930,699; Rakowsky, et al., U.S. Pat. No. 2,358,827; Anderson, "Wet Milling Properties of Grains"; Bench-Scale Study, Cereal Science Today, Vol. 8, No. 6, p. 190 (July 1963): and Radley, "Starch and Its Derivatives", 3rd Ed., Vol. 2, p. 27 (1953).

Wet milling of corn has, in the past, been more successful than the wet milling of wheat. This is primarily true because the gluten protein of the corn is deliberately degraded in the process of wet milling corn to promote the release of and to improve the purity of the corn starch.

Because starch is the primary desired constituent of corn, wet milling of corn by degrading the gluten protein is reasonably efficient and economical. A series of articles entitled "Wet Process Corn Milling" by Bartline appeared in the American Miller describing this process, e.g., see American Miller, August 1940, pp. 40, 41 and 82; September 1940, pp. 46–48 and 58; October 1940, pp. 28 and 30; December 1940, pp. 25–28, 30 and 84 and 85; February 1941, pp. 32–34 and 89; March 1941, pp. 48, 50, 97 and 98; May 1941, pp. 34–46, 104 and 105; June 1941, pp. 38, 40, 98 and 99; August 1941, pp. 40, 42, 81 and 82; October 1941, pp. 46, 47 and 85; November 1941, pp. 32, 33 and 37; and December 1941, pp. 34, 47 and 86.

Other articles showing wet milling of corn and grain sorghum are Watson, et al., "Laboratory Steeping Procedures Used in a Wet Milling Research Program", Cereal Chem., Vol. 28 (1951), pp. 105–108, and Anderson, "A Pilot Plant for Wet Milling", Cereal Science Today (April 1957), pp. 78–80. Illustrative of patents disclosing the wet milling of corn are Lander, U.S. Pat. No. 1,391,065; Sherman, U.S. Pat. No. 1,554,301; Eckers, U.S. Pat. No. 2,556,322; Newkirk, et al., U.S. Pat. No. 2,573,048; Dowie, U.S. Pat. No. 3,029,169; Slotter, et al., U.S. Pat. No. 2,527,585; Burkhardt, U.S. Pat. No. 251,827; and Willford, U.S. Pat. No. 1,061,933.

Although the literature, as discussed above, is replete with descriptions of wet milling techniques for corn and some other grains, there was, until the inventions of Durst and Winters, U.S. Pat. No. 3,788,861, issued Jan. 29, 1974, and Rogers and Gidlow, U.S. Pat. No. 3,851,085, issued Nov. 26, 1974, no economical or efficient means of hydroprocessing wheat to obtain the endosperm free of husk and in the case of Rogers, et al., free of germ too, wherein the starch granules of the endosperm are maintained in an intact, ungelatinized form and the gluten protein of the endosperm is maintained in a dispersible and substantially undenatured state with respect to doughing function.

The Rogers, et al., patent, U.S. Pat. No. 3,851,085, and the Durst, et al., patent, U.S. Pat. No. 3,778,861, are incorporated herein by reference since the present process represents an improvement on these techniques. Also incorporated by reference herein is Rogers and Durst, U.S. Pat. No. 3,832,472, issued Aug. 27, 1974.

The process of this invention is applicable to hydroprocessing of grain generally, including that process disclosed by the Durst, et al., U.S. Pat. No. 3,788,861. In the Durst, et al. process, the entire wheat kernel is ground in an aqueous medium at a temperature of not over 104° F. The husk or bran is then separated from the mixture of endosperm and germ, after which some of the water is removed. Prior to grinding, it is preferred that the polyphenol oxidase activity be reduced below nine activity units. The starch granules are maintained in an intact ungelatinized form and the gluten protein is substantially undenatured with respect to doughing function. The cellular structure of the wheat is disrupted and the starch and protein particles exist independently of each other. The pH is not substantially altered in this process.

While the process of this invention is applicable generally to hydroprocessing techniques, it will be described, for purposes of clarity, with regard to application to the preferred hydroprocess of the previously incorporated by reference Rogers and Gidlow patented process. In any such lengthy process as that described in the Rogers and Gidlow U.S. Pat. No. 3,851,085 patent necessarily there are several periods of long hold time in the overall process. Moreover, typically in the Rogers and Gidlow process the hold time involves the presence of wheat at temperatures ranging from 18° C. up to about 45° C. In addition, during certain of the steps described in the Rogers and Gidlow patented process, fairly complex pieces of equipment are utilized. This complex equipment provides a potential opportunity for some of the wheat being treated in the process to become entrapped in certain areas of the equipment not conducive to ready circulation, referred to herein as "dead spots".

Because of the conditions of temperature and the fact that wheat is an ideal substrate for growth of micro-organisms, care must be taken to insure that any wheat entrapped in dead spots within the system does not become an effective nutrient substrate for the growth of undesirable micro-organisms which might contaminate the overall process and, of course, the end product.

While to date no significant problems have occurred with the practice of the Rogers and Gidlow process, a maximum of safety precautions must be taken with food products. This is especially true because dead spots may exist within the overall Rogers and Gidlow process, because wheat flour is a known effective nutrient substrate for micro-organisms, and because conditions of temperature and moisture are right for the growth of micro-organisms in the system. As can well be appreciated, the growth of pathogenic organisms such as *Staphylococcus*, *Clostridium perfringens*, *Salmonella* and *Escherichia coli* necessitate a complete shutdown of the process, a complete scrapping of the product, a thorough cleaning, and sterilization before any subsequent attempts to run the process could be conducted.

The improved process of the present invention insures that the hydroprocessing system will not be contaminated by pathogenic organisms.

The improved process of this invention allows operation of steeping-type hydroprocess, such as Rogers and Gidlow, at higher steeping pH's, since no need exists for acid deactivation of micro-organisms. Acid and alkali consumption is thereby reduced and gluten functionality is enhanced.

SUMMARY OF THE INVENTION

The primary object of this invention is to provide an efficient, commercially operable method for hydroprocessing wheat to obtain a wheat product free of husk while, throughout the process, maintaining the starch granules in an intact, ungelatinized form and the gluten protein in a dispersible and substantially undenatured state with respect to doughing functions; and to assure that the process is conducted in a manner which will prevent any possibility of the growth of pathogenic organisms in the system.

A further object of this invention is to provide a method of hydroprocessing wheat wherein the process system is flooded by inoculation with harmless organisms which will grow, do no damage to the ultimate endosperm product, and which will exclude the possibility of the growth of any pathogenic organisms within the processing system.

The above and other objects of this invention are obtained by an improved hydroprocess for separating the endosperm from the non-endosperm tissue of wheat, wherein the aqueous medium is flooded with harmless bacterial organisms which will grow to the selective exclusion of any pathogenic organisms in the process. While the organisms are typically killed in subsequent drying of the hydroprocessed wheat product, even if they were not killed, there would be no problem since the organisms are known to be harmless to man.

The aqueous medium is inoculated with a harmless bacterial organism, preferably of the genus Lactobacillus, and is preferably inoculated to achieve an organism density of at least $10^3$ Lactobacillus organisms per gram of aqueous medium and preferably $10^5$ Lactobacillus organisms per gram of aqueous medium. The most preferred Lactobacillus organism is *Lactobacillus fermentum*. However, other members of the Lactobacillus genus, as well as other known harmless bacteria, are also operable in the process.

It is also preferred that the dissolved oxygen content of the steeping liquor be kept at less than 5% by volume. This further assures that the harmless Lactobacillus or other harmless organisms will grow to the exclusion of aerobic organisms.

DESCRIPTION OF THE PREFERRED EMBODIMENTS

Figure 1:
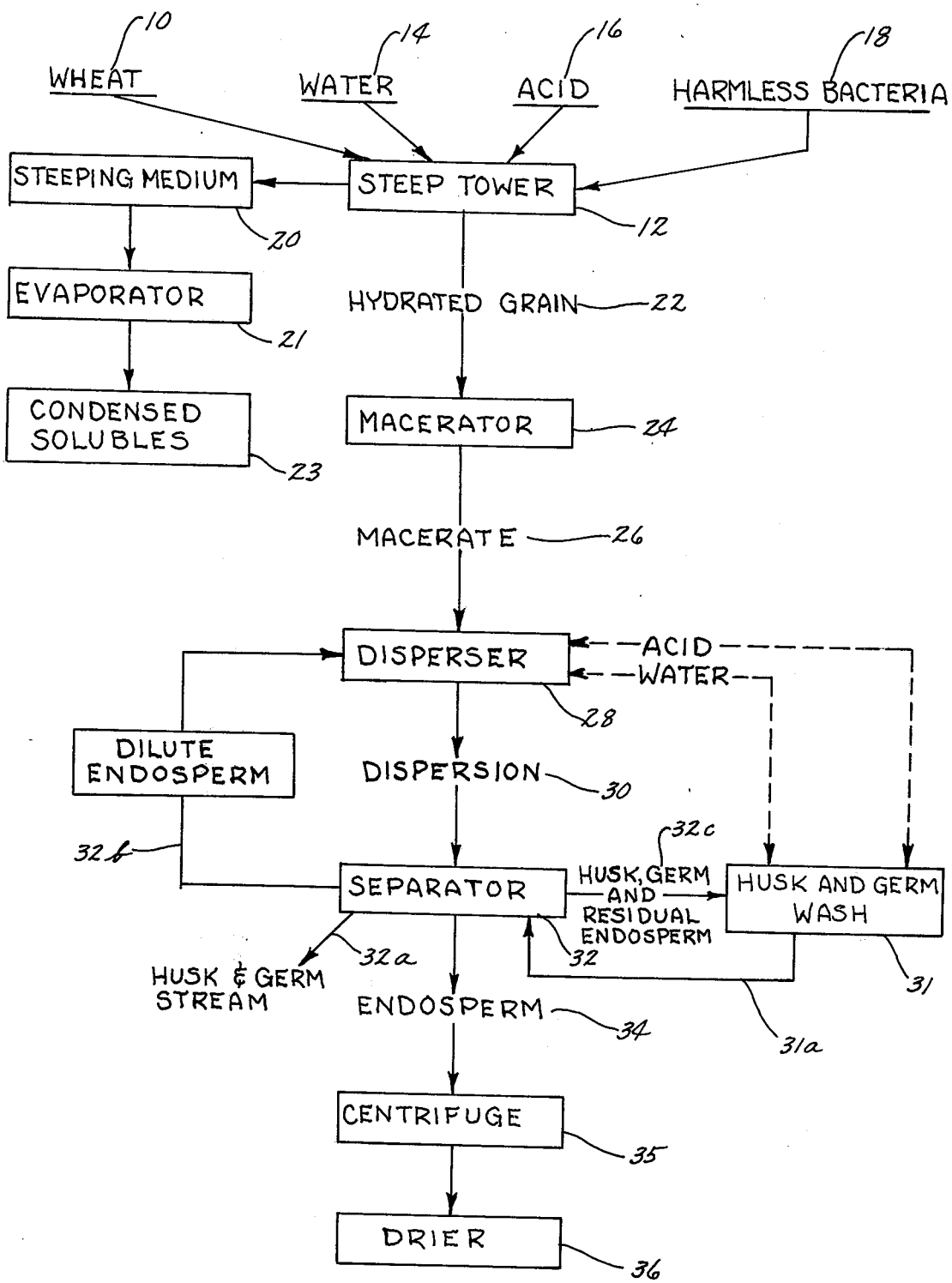
FIG. 1 is a schematic flow diagram of the preferred hydroprocess of this invention, wherein dotted lines indicate alternative treatments.

The hydroprocess of this invention is directed primarily toward an efficient commercially operable method of processing wheat in a manner which insures that there is no possibility for the growth of harmful pathogenic components in the hydroprocessing system. As will be appreciated in the discussion below, the entire process system becomes flooded with harmless organisms, so that if any organisms grow in any dead spots in the system, they will be harmless organisms which will not contaminate the wheat, the endosperm or the compoents thereof.

This invention will be described in terms of the Rogers and Gidlow process. However, it should be understood that this invention is applicable to hydroprocessing systems generally.

In the Rogers and Gidlow process, the hydroprocess is initiated by steeping wheat in an aqueous acid steeping medium. The aqueous medium is, according to this invention, inoculated with a harmless organism which will selectively grow in any dead spots of the overall process to the substantial exclusion of growth of any pathogenic organisms. The hydrated wheat is then separated from the residual steeping medium and macerated to split the husk envelope and expose the endosperm as a plastic mass. The macerated wheat is dispersed in an acid dispersing medium wherein sufficient shear is utilized to disengage the endosperm from non-endosperm tissue while maintaining at least 90% by weight of the particles of non-endosperm tissue above a minimum dimension of 300 microns. The non-endosperm tissue is then separated from the dispersed endosperm and the endosperm is generally concentrated or dried. Throughout this process, substantially all of the starch granules are maintained in an intact, ungelatinized form and the gluten protein is maintained in a dispersible and substantially undenatured state with respect to doughing function.

This hydroprocess can be performed either as a continuous process or a batch process. The various processing steps utilized herein will be described sequentially and more specifically below. As will be apparent from the following description, the preferred process involves inoculating the steeping wheat during the steeping process and preferably when the steeping process is about one-half completed. However, if desired, the inoculation with the harmless organisms utilized in the process of this invention can be accomplished after the steeping process is completed or a broth of the inoculant can be added to the wheat prior to beginning the steeping process. For clarity of description, the steeping process will first be described and, thereafter, the inoculation process.

STEEPING THE WHEAT

Initially, in this hydroprocess, one part by weight of wheat is steeped in at least 0.6 parts by weight of an aqueous acid steeping medium at temperatures ranging from about 18° C. to about 45° C. until the final moisture content of the steeped wheat ranges from 41% to 56% by weight of the hydrated grain. The steeping medium contains acid in concentration and quantity sufficient to maintain the pH of the steeping medium external of the wheat between 1.2 and 5.0 and to reduce the internal pH of the hydrated wheat to between 3.0 and 5.6 from an initial pH of about 6.2.

Steeping wheat in a steeping medium as described above softens and swells the endosperm and renders the husk tissue pliable so that the endosperm can be cleanly disengaged from the adjoining aleurone layer without extensively disrupting the husk envelope. The germ, although hydrated, remains tough and largely intact throughout the steeping process and subsequent steps, thus facilitating its separation from the endosperm. Throughout steeping, the wheat kernels remain largely intact with only a small fraction bursting to expose the endosperm.

The steeping medium is also instrumental in extracting most of the water-soluble color from the wheat, thus providing a final endosperm product which is essentially white. The low pH of the steeping medium also prevents microbial spoilage and represses respiration and autolytic reactions.

Additonally, the acid steeping medium reduces the internal pH of the wheat to at least 5.6 and preferably to about 5.2, and reversibly alters the gluten protein sufficiently to suppress glutenation into sticky masses and thus maintains the protein in a dispersible condition in subsequent processing steps. The reversible alteration of the gluten protein also minimizes absorption of the gluten protein on the husk tissues and on surfaces of equipment used in this process.

The steeping medium utilized herein is a mixture of water and strongly or moderately dissociated edible acids. Examples of such acids include hydrochloric, sulfuric, phosphoric and lactic acids. These acids can be utilized singly or in combination with each other with acceptable results. Hydrochloric acid is, however, highly preferable for use herein because on terminal neutralization of the extracted endosperm, sodium chloride is generated in amounts compatible with usual formulations of dough products. Hydrochloric acid is also quite inexpensive and can be readily obtained in edible grades.

The acids other than hydrochloric acid can afford certain processing advantages such as increasing the rate of sedimentation of colloidally dispersed endosperm; however, the salts from these acids formed on terminal neutralization of the endosperm may affect dough performance in minor ways if such salts are present in large quantities. Accordingly, it is generally preferred that these acids be utilized in the steeping medium in combination with hydrochloric acid.

The steeping medium should contain sufficient quantities and concentrations of the strong and moderately dissociated acids to maintain the pH of the steeping medium external of the wheat between 1.2 and 5.0 and to reduce the internal pH of the hydrated wheat from an initial pH of about 6.2 to between 3.0 and 5.6. The internal pH should not be lowered below the pH at which the gluten will be irreversibly altered or denatured.

The initial pH of the steeping medium and the subsequent course of changes in pH of the steeping medium relate to the quantity of acid contained in the total volume of steeping medium. The quantity of acid should be sufficient to reduce the pH of the interior of the hydrated wheat to between 3.0 and 5.6 and, preferably, between 3.5 and 5.2. This reduction in pH is effected to suppress incipient micellar aggregation of the gluten protein during ensuing processing steps and to suppress enzymatic action. At the same time, the concentration of acid should be sufficient to maintain the pH of the steeping medium exterior to the wheat in the range of 1.2 and 5.0, preferably between 1.5 and 4.5. The initial pH of acid steeping medium inhibits or destroys the growth of harmful micro-organisms in the steeping medium and on the surface of the wheat.

As steeping progresses, acid is sorbed by the wheat and also neutralized by acid binding substances extracted from the wheat into the steeping medium. During steeping, the wheat swells so that the submerged volume of the wheat increases to about 1.8 times the original volume. At least 1.0 part of steeping medium per part of wheat is required to keep the wheat completely submerged during steeping. Steeping can be accomplished mechanically with, for example, a nonflooded screw conveyor using as little as 0.6 parts steeping medium per part of wheat. However, this steeping method is usually slower, more expensive and, therefore, less desirable than submerged steeping. Generally, from about 1.0 part to about 5 parts of steeping medium per part of wheat are utilized in steeping. It is generally desirable to use a minimum volume of steeping medium to minimize cost of removing water during recovery of the solubles extracted during steeping or in processing the steeping medium for reuse. Therefore, it is preferred that 1.0 to 2.0 parts and, most preferably, about 1.25 parts of steeping medium be utilized per part of wheat.

The quantity of acid in the steeping medium required to maintain the pH in the specified ranges depends upon the type of acid employed, the amount of steeping medium, and the level of sorption at which steeping is terminated. The quantity of acid can, therefore, be readily ascertained by correlating these variables within the ranges hereinafter specified. The amount of acid sorbed by the wheat from the steeping medium should, preferably, not exceed the amount of acid later required to establish the pH at near optimum in the dispersing step later described.

Generally, spoilage by harmful micro-organisms is initially adequately suppressed when the pH of the steeping medium exterior of the wheat is maintained below 4.5.

The wheat should be steeped at temperatures ranging from about 18°C. to about 45°C. until it has a moisture content of from about 41% to about 56% by weight of the hydrated wheat. The rate of sorption is relatively slow at lower temperatures and increases as the temperature increases. It is therefore desirable to use temperatures of 18°C. or higher to minimize steeping time. It is also preferred that temperatures of above 45°C. not be utilized herein except for very short time periods to avoid incurring incipient biochemical damage to the starch and gluten protein. In order to minimize steeping time and avoid damage to the starch and protein, it is preferred that steeping temperatures used herein range from about 37°C. to about 42°C.

The wheat, after steeping, should have a moisture content of from 41 to 56% and, preferably, from 45 to 50% by weight of the steeped wheat.

The final moisture content relates to the energy required to disperse the macerated wheat, and, concomitantly, the extent to which the husk and germ are fractured into undesirably small fragments. Accordingly, the wheat is steeped until it has final moisture content of from about 41% to about 56%, preferably 45 to 50%, and most preferably 46 to 48%, by weight of the hydrated wheat. Generally, steeping of the wheat can be accomplished in from about 5 hours to about 30 hours. At temperatures between 37°C. and 42°C., 46 to 48% moisture is usually obtained in 12 to 24 hours, preferably 16 hours.

In the structure of the wheat kernel, a partially enclosed cavity of appreciable size underlies the crease of the kernel. When the kernel is submerged in steeping medium, the air in the cavity is not immediately displaced. Consequently, microorganisms residing in this space are imperfectly exposed to the growth inhibiting acid medium and, therefore, some growth of these micro-organisms may occur. This difficulty can be eliminated by displacing the entrapped air either prior to steeping or during the initial phase of steeping.

The air can be eliminated during the initial phase of steeping by reducing the air pressure over the wheat to less than 200 mm. of mercury and preferably less than 100 mm. of mercury either prior to or during submersion of the wheat in the steeping medium. By applying a vacuum to the wheat, air is drawn from the cavity and is replaced with steeping medium upon release of the vacuum. Steeping medium equivalent to about 5 to 6% by weight of the wheat is drawn in the cavity. A vacuum can be applied to the steeping medium containing the wheat in batch operations or in a continuous operation.

In an alternative method, the air surrounding the wheat in a holding vessel or silo can be diffusively replaced by gaseous carbon dioxide. When wheat so charged with carbon dioxide is submerged in the steeping medium, the carbon dioxide is absorbed into the aqueous phase with resultant flooding of the cavity.

INOCULATION OF THE STEEPING WHEAT

As heretofore briefly described, the steeping step of the hydroprocess of this invention and the sorption of the steeping medium by the wheat is usually accomplished within 12 to 24 hours, and most preferably within about 16 hours. Again, as heretofore briefly mentioned, the harmless micro-organisms utilized to flood the process of this invention can be added to the wheat prior to steeping, during steeping, or after steeping. Preferably, the organisms are added during the steeping process and most preferably when the process of steeping is about half completed which, with regard to the preferred 16-hour steeping period, would be at the 8-hour time.

The organisms utilized in the process of this invention can be any micro-organism harmless to humans and which can selectively grow and regenerate within the environment of the overall hydroprocess described herein to the exclusion of any pathogenic organisms. generally, it has been found that preferred organisms which will thrive within the environment of the overall hydroprocess of this invention can be found within the genus Lactobacillus. Within the genus Lactobacillus there are many species or organisms. Examples of such species are *Lactobacillus lactis*, *Lactobacillus bulgaricus*, *Lactobacillus acidophilus*, *Lactobacillus plantarum*, *Lactobacillus brevis*, *Lactobacillus debrueckii*, and *Lactobacillus fermentum*. Of these several species of the genus Lactobacillus, the most preferred organism for utilization in the process of this invention has been found to be *Lactobacillus fermentum*. While other harmless organisms and, more specifically, other than harmless members of the genus Lactobacillus will work in the process of this invention, it has been found that the most preferred species, *Lactobacillus fermentum*, seems to grow best within the environment of the overall hydroprocess described herein and, therefore, is most beneficial from the standpoint of selective growth in any dead spots in the system to the exclusion of the growth of any pathogenic organism.

The organisms which grow and successively regenerate within the process of this invention are carried through the subsequently described process steps and eventually flood the entire system. If there are any dead spots in the system, those dead spots become filled with the harmless organism, preferably with an organism selected from the genus of Lactobacillus, and most preferably of the species *Lactobacillus fermentum*. The harmless organisms in these dead spots also continually seed the entire system and thereby create environmental conditions non-conducive to the growth of pathogenic organisms.

In another preferred embodiment of the invention, it is preferred that at least two strains of the harmless organism be utilized to flood the hydroprocessing system. Utilizing two strains and alternating the strains with subsequent runs of the process reduces the risk that bacteriophage will attack the desired harmless bacteria.

Additionally, in order to assure even further that nondesirable and, perhaps, harmful bacterial strains will not grow within the hydroprocessing system of this invention, it has been found desirable to keep the dissolved oxygen content of the liquid within the overall process to less than 5% by volume, preferably less than 3% dissolved oxygen, and most preferably less than 1% dissolved oxygen by volume. Doing so assures that no undesirable yeasts will grow and that no undesirable aerobic bacteria, those which require oxygen to survive, will grow within the system. Keeping the dissolved oxygen content below the level specified herein is not difficult and can be done by avoiding unnecessary whipping of air into the system, by making sure that there are no air leaks in the system through which air can be drawn into the process, and like precautions such as flooding the system with carbon dioxide or nitrogen.

The precise amount of organism added as an inoculant is not critical except that a sufficient amount must be added to insure that any dead spots within the system will be seeded by the harmless organisms. Generally it has been found that the liquid medium must contain a sufficient amount of organisms to provide an organism density of at least $10^3$/grams steep. The preferred density is at least $10^5$ organisms per gram of steep and most preferably $10^7$ organisms per gram of steep. As utilized herein, the term "per gram of steep" means per actual gram of weight of the entire steep, including the steeping medium and the wheat.

As heretofore explained, during the steeping process the pH changes as steeping medium is sorbed into the wheat. Preferably, the micro-organisms of this invention are added when the pH of the steeping medium is not less than 2.5. This assures that the added harmless bacterial organism will not be killed or otherwise deactivated by a highly acid environment. Again, as heretofore mentioned, it has been found most preferable to add the inoculant of bacteria when the steeping process is about half completed in terms of the overall time of the steeping process.

The inoculum of the harmless bacterial organisms of this invention is preferably added in the form of a bacterial broth containing a bacterial starter organism but could be added by washed cell suspension, freeze dried culture or any other conventional inoculation methods. No criticality exists with regard to the broth employed and any suitable broth which acts as a nutrient for the bacterial starter can be utilized. Preferably, however, where the harmless organism which is selectively grown within the system is of the genus Lactobacillus and the most preferred organism *Lactobacillus fermentum*, about 3% by weight of dextrose is added to the broth to assure an adequate nutrient system for the growth of a healthy starter culture.

A typical formulation for a bacterial broth utilized to be added to the steeping medium of this invention is as follows:

| Ingredient | Percent |
| --- | --- |
| Distilled Water | 93.37233 |
| Dextrose | 2.80117 |
| Tryptone | 1.16715 |
| Yeast Extract | 0.70029 |
| Dipotassium Phosphate | 0.46685 |
| Sodium Chloride | 0.46685 |
| Sodium Citrate | 0.46685 |
| Magnesium Sulfate | 0.07469 |
| Manganese Chloride | 0.01307 |
| Ferrous Sulfate | 0.00373 |
| Thiamine Hydrochloride | 0.00009 |
| *Lactobacillus fermentum* | 0.46685 |

The inoculum heretofore described has an organism density of $10^8$ organisms per ml of broth. Preferably, the inoculum should have an organism density within the range of $10^4$ to $10^9$. Such organism densities within the inoculum or starter culture broth will insure that the desired organism densities herebefore specified will occur within the steeping medium.

With regard to the above-described inoculum broth for the specific example given herein, a two-liter quantity was made. The 2-liter broth was sterilized for 15 minutes at 121° C., 15 p.s.i. pressure, and allowed to cool to 40° C., inoculated with organism and allowed to incubate at 40° C. for 8 to 24 hours and, thereafter, the broth is ready for aseptic transfer to the steeping medium.

With regard to the most preferred process where the harmless organism bacterial broth is added to the steeping wheat after approximately one-half of the steeping process is completed, after the remaining one-half portion of the steeping time has expired, the organism density of the entire steep will have reached the heretofore specified preferred levels and the organisms will thereafter be carried through the entire process, and seed any dead spots in the process to the exclusion of any possible pathogenic organisms, thereby preventing the growth of such pathogens.

Where the harmless bacterial organisms are added to the steep medium prior to the addition of the wheat, care must be taken to provide pH's not less than 2.5, since the bacterial organisms may be harmed, deactivated, or otherwise prevented from subsequent growth and successive regeneration. Of course, where the organisms are added after the steep is completed, it is necessary to assure that the organism density heretofore described is reached. This can be done by increasing organism concentration or holding the steep until desired levels are attained.

In those hydroprocessing systems not utilizing a steeping step such as described by Durst, et al., U.S. Pat. No. 3,778,861, the inoculum can be added at any time. Preferably, the inoculum is added in the first step of the process to insure that the harmless bacteria will be seeded throughout the system.

SEPARATION OF WHEAT FROM THE RESIDUAL STEEPING MEDIUM

When the wheat has sorbed sufficient steeping medium as described above, the residual steeping medium is usually drained from the hydrated wheat. In batch operations, this separation can be done simply by draining the excess steeping medium from the steeping vessel through a screen. Preferably, the drained wheat is washed with fresh steeping medium to remove residual pigment carried in the steeping medium adhering to the wheat.

The separation step can be accomplished as a batch operation, as described above, or the steeping and separation steps can be accomplished together in a continuous process. For example, steeping and separation of the steeping medium from the hydrated wheat can be accomplished in a continuous operation by introducing the wheat at the top of a cylindrical tower or silo. The steeping medium can be added confluently with the wheat, but, preferably, it is introduced at the base of the tower to move countercurrently to the flow of wheat to effect efficient extraction of color. As the hydrated wheat is withdrawn from the base of the tower, the wheat moves downwardly at a rate providing the retention time necessary to attain the desired sorption.

It should be recognized that this separation step can be accomplished in a great variety of ways with a variety of conventional equipment.

MACERATION OF HYDRATED WHEAT

In this step of this hydroprocess, the husk of the hydrated wheat is split and the endosperm is exposed as a plastic mass. The manipulative step of splitting the husk and exposing the endosperm as a plastic mass has been called "maceration" herein. Maceration is used in the sense of crushing, squeezing and rubbing the wheat and is distinguished from cutting, chopping or tearing of the wheat.

In this process, maceration is utilized to effect an initial breakdown of the structural association of the endosperm with the husk and the germ with minimum disruption of these non-endosperm tissues. This type of breakdown is necessary to enable subsequent dispersion of these components by hydraulic shear and elutriation.

Although the gluten protein and the glutenating properties thereof are somewhat altered during the steeping step, the concentration of water in the hydrated wheat during maceration is such that the endosperm is still potentially doughable. Consequently, it is important to accomplish maceration with a minimum of work and orientative shear to avoid micellar association of the gluten protein into difficulty dispersible masses.

In order to minimize micellar aggregation of the gluten protein, the internal pH of the wheat should be between 3.0 and 5.6 as hereinbefore stated. Ordinarily and preferably, the pH of the hydrated wheat will be between pH 3.5 and 5.2 At the lower end of this pH range, the endosperm can be worked to a greater extent with a lesser chance of formation of glutenous masses than at the upper end of this pH range. Accordingly, the work during maceration should be regulated inversely to the pH of the endosperm.

Effective maceration splits the husk envelope of over 99% of the wheat kernels and exposes the endosperm as a plastic mass which can be easily dispersed in subsequent operations. The husk envelope is fragmented into only a few pieces with, generally, over 90% of the husk being accounted for by particles over one millimeter in size. At least 90% by weight of the husk and germ must be maintained above a minimum dimension of 300 microns to achieve effective maceration. This condition enables clean separation of the husk from the endosperm in the downstream dispersing and separation steps. The aleurone layer of the endosperm remains firmly attached to the husk and, later, is removed from the endosperm with the husk. Removal of the aleurone layer is particularly desirable to obtain light-colored endosperm products since the aleurone tissue is highly pigmented.

Effective maceration also leaves the germ substantially intact as rather tough, rubbery, smoothly contoured bodies. The germ is released partly as free bodies and partly as bodies loosely attached to the husk. As with the husk, the relatively intact germ can be cleanly separated from the endosperm in ensuing operations. Because of its high content of unsaturated fats, clean separation of germ from endosperm contributes importantly to oxidative stability of products derived from the endosperm.

The crushing, squeezing and rubbing required during maceration can be accomplished with machines giving an extruding or milling action. On a commercial scale, Weiler food grinders and Rietz Extructors are effective macerators. These machines crush and mull the wheat so that the endosperm is effectively exposed without extensively disrupting the husk envelope or the germ.

DISPERSION OF MACERATED WHEAT

After maceration, the macerated wheat is dispersed in an aqueous dispersing medium to a solids concentration of from about 4% to about 30%. The pH of this dispersion is maintained between about 3.0 and about 5.6. The macerated wheat is dispersed in the dispersing medium with sufficient shear to disengage the endosperm from particles of non-endosperm tissue while maintaining at least 90% by weight of the particles of non-endosperm tissue above a minimum dimension of 300 microns.

When recycle of process liquids is not practiced, the dispersing medium, like the steeping medium, is a mixture of water and strong or moderately dissociated edible acids. When recycle of process liquids is practiced as shown in FIG. 1, the dispersing medium contains, in addition to water and acid, soluble endosperm components. Examples of the acids useful herein include hydrochloric, sulfuric, phosphoric and lactic acids. These acids can be utilized singly or in combination with each other with acceptable results. Hydrochloric acid is preferred because it is inexpensive and the sodium chloride formed on terminal neutralization of the extracted endosperm is compatible with dough formulations.

The pH of the dispersion containing the macerated wheat and the dispersing medium should range from about 3.0 to about 5.6 and, preferably from 3.5 to 5.2.

Another important factor in this dispersing step is the concentration of solids in the dispersion. It is preferred herein to disperse the macerated wheat in the dispersing medium to a solids concentration of from about 4% to about 30%. By dispersing the wheat in a relatively large volume of dispersing medium, the tendency of the gluten protein to associate is greatly reduced. The appropriate level of solids in the dispersions depends, to some extent, on the type of equipment used in separating the finely particulate endosperm from the coarsely particulate husk and germ. This will be explained further hereinafter.

Dispersion is, preferably, effected by hydraulic shear which disintegrates the endosperm into a dilute suspension of fine particles and a solution of soluble components, while maintaining the husk and germ in a coarsely particulate state. This type of dispersion facilitates recovery of the endosperm in the separation step of this process. The macerated wheat should be dispersed rapidly to suppress glutenation of the gluten protein. The dispersing means should provide sufficient shear to disperse the endosperm components finely while maintaining the structural integrity of the husk and the germ tissue. Over 90% by weight of the husk and the germ should be retained on a 300-micron screen and, preferably, over 80% of the non-endosperm tissue should be retained on a 1,000-micron screen.

By utilizing this dispersing technique, up to 99% of the endosperm is dispersed as particles substantially less than 300 microns in size. The remainder of the endosperm is comprised of schnitt, a fraction of endosperm with thick cell walls which resists disintegration. In later operation, the schnitt appears as tiny, scallop-shaped particles that are readily separated from the endosperm with the husk and germ fractions.

A wide variety of mixing or pumping equipment comprising an impeller which imparts shear between turbulent layers of liquid can be used in this dispersing step.

The shear should be imparted by a dispersing means which acts on the body of liquid with relatively little cutting impingement on suspended particles.

The dispersion step can also be combined with the separation operation. For example, a submerged screen reel can be utilized to disperse the macerated wheat in the dispersing medium by arranging impeller blades or paddles radially on the rotating shaft supporting the cylindrical screen. The macerated wheat and the dispersing medium can be directed into the input of the reel where the macerated wheat undergoes rapid dispersion while moving through the body of the reel. The dispersed endosperm escapes through the rotating screen surrounding the rotating shaft while the husk and germ continue through the reel and are subsequently discharged at the outlet end.

SEPARATION OF NON-ENDOSPERM TISSUE FROM ENDOSPERM

This step of the hydroprocess involves separating the relatively intact, non-endosperm tissue from the endosperm dispersion. It also involves in varying degree, depending upon the particular mechanical means employed, the continuing and terminal disengagement of the native bonding association of endospermal and non-endospermal tissues.

The appropriate concentration of solids in the dispersion is primarily dependent upon the particular means used, concentrations of from about 4% solids to about 30% solids can be used in this separation step.

A variety of separation means can be utilized herein without blinding or fouling because the non-endospermal tissues are substantially intact and the pH is regulated to inhibit glutenation of the gluten protein. Any separation device or serial arrangement of such devices that will separate over 90% of non-endosperm tissue from finely particulate endosperm can be used herein.

Treatment of the endosperm dispersion, following separation of husk, germ and schnitt, depends on prior processing in relation to intended use of the extracted endosperm and the economical disposition of water. If desired, the endosperm can be thereafter dried by conventional means to a dry product ready for use in baking or, alternatively, can be separated into its component parts in accord with the process described in the Rogers and Gidlow patent, U.S. Pat. No. 3,851,085, beginning at column 14 through column 19, which is specifically incorporated herein by reference.

Examination of the endosperm product, prepared in accord with the process of this invention reveals that the product had a total absence of pathogenic organisms, and after several different runs no indication of the presence of any pathogenic organisms occurred. The only organisms shown to be present were Lactobacillus organisms, and in the case of the most preferred organism, *Lactobacillus fermentae*. Of course, even though the Lactobacillus organisms and the preferred *Lactobacillus fermentae* organism are harmless, most of the organisms are killed or deactivated inherently by the final drying step of the endosperm. If final drying is not to be a complete drying of the endosperm but rather a decreasing of the moisture content to a suitable level to make a dough, it may be desirable to pasteurize the product. Of course, the microbiological concerns of the hydroprocessing system end when the process is no longer a wet process. Thus, once the endosperm is dried microbiological activity is no longer a serious concern.

The following example is offered to further illustrate, but not limit, the process of this invention. All percentages and ratios in the following example, as well as in the specification and in the appended claims are by weight unless otherwise specified. For purposes of clarity, the following example is given with continuing reference to the flow chart, FIG. 1 of the drawing.

EXAMPLE

One hundred and sixty-seven pounds of a mixture of spring and winter hard, red wheat 10, having a moisture content of 12% and a wheat solids content of 147 pounds of solids was hydroprocessed as hereinafter described. The process was operated on a continuing throughput basis, but for purposes of clarity will be presented herein as a batch process describing and following the flow of a particular batch corresponding to the throughput per minute of wheat through the entire process. The wheat 10 was fed into steeping tower 12, 206 pounds of water 14 was fed into steep tank 12 along with the previously described wheat 10. In addition, one pound of 32% hydrochloric acid 16 was added to steep tower, or tank, the two terms utilized herein interchangeably, 12. The steep solution in steep tower 12 was, after dilution with the water 14, a 0.04 normal (pH about 1.7) hydrochloric acid solution which comprised 55.3% by weight of the material in steep tower 12 and the wheat comprised 44.7% by weight of the material in steep tower 12. The temperature of the steeping medium in steep tower 12 was adjusted to 40° C. The ratio of wheat to steep solution was about 1 to 1.25. The steeping medium was circulated continuously by percolation through the bed of wheat. The underflow was pumped through a heat exchanger to the top of the bed. This continual circulative percolation through the bed of wheat in steep tower 12 was utilized to increase the rate of sorption.

After steeping was continued for a period of eight hours, and the pH of the steep solution increased to 3.0. because of acid sorption by the wheat, harmless bacteria of the genus Lactobacillus, species *fermentum*, were added in a sufficient quantity to obtain a population of from about 100,000 to about 900,000 per gram of steep liquor when the organism density was measured one hour after inoculation.

The broth utilized to add the harmless Lactobacillus organism was 2 milliliters of the broth previously described and set forth herein in detail. The oxygen level within the steep tank 12 was regulated, within the best control means possible, to achieve an oxygen saturation level of less than 5% by volume.

In the flow chart the bacterial organism added is referred to by the numeral 18.

Steeping in the manner previously described was continued for an additional eight hours with the recirculation previously described continuously occurring. After a total steeping time of 16 hours, the steep liquor, or steeping medium 20, was drained from steep tower 12 and the hydrated grain 22 was also removed from steep tower 12. The steep liquor had a pH of 3.5 and a solids content of 1.4%. The hydrated grain 22 had a pH, that is an internal pH, of 5.2, and was comprised of 53% solids, and had a *Lactobacillus fermentum* organism density of from $10^6$ to $10^7$ per gram of steeped wheat. The hydrated grain 22 had a moisture content of 47% by weight.

The hydrated grain 22 was fed into macerator 24 and was macerated therein to split the husk and expose the endosperm as a plastic mass. The macerator 24 was a Weiler food grinder. In the maceration step at least 90% of the husk and the germ were maintained above a minimum dimension of 300 microns.

The steeping medium 20, for purposes of efficiency of the overall process, can be fed into evaporator 21 and evaporated to dryness to provide a condensed solubles product 23, which is utilizable for animal feed, fertilizer or like uses.

The macerate 26 comprised 283 pounds of material having a solids content of 146.1 pounds, 52% solids, and had a *Lactobacillus fermentum* organism count ranging from a minimum of $10^6$ to a maximum of $10^7$ total plate count per gram of macerate 26. The macerated wheat 26 was thereafter fed to a dispersing loop consisting of a reservoir, a centrifugal pump and a supraton mill. The reservoir pump and supraton mill of the dispersing loop are not specifically shown in the flow chart, but are represented by disperser 28. The dispersing medium utilized in disperser 28 was a dilute dispersion of endosperm fed back from the second screening centrifuge, discussed below. The macerated wheat was dispersed to a solids concentration of 11% and the dispersion was maintained at a pH of 5.2 by a controled input of hydrochloric acid. The dispersion 30 was withdrawn continuously from the dispersing loop into the first stage of a two-stage centrifugal screen separating system, represented by separator 32. Mercone screening centrifuges were employed in both stages. Dispersed endosperm 34 at 9% solids was withdrawn from the first screen centrifuge and the separated fraction of husk and germ and some residual endosperm 32c was dispersed with water in a husk and germ wash 31 at about 6% solids. The dispersion line 31a was separated by the second stage centrifugal screen into a husk and germ stream 32a at 32% solids and a dilute dispersion of endosperm 32b. The stream of dilute endosperm 32b was directed as dispersing medium into the first stage dispersing loop as shown by line 32b. The effective screen openings in the separating system were as follows:

First stage centrifuge—381 micron diameter round;
Second stage centrifuge—381 micron diameter round.

The separated endosperm 34 was centrifuged 35 to concentrate to 40% solids. The concentrated endosperm was neutralized with NaOH to a pH of about 6.5. The supernatant soluble stream from the endosperm concentration can be used to replace water in the process. The concentrated endosperm was flash dried in drier 36. No evidence of growth of pathogens occurred.

When the process of the above example is repeated utilizing other Lactobacillus species such as *Lactobacillus lactis, bulgaricus, acidophilus, plantarum, brevis*, and *debrueckii*, substantially similar results are obtained in that the system is operated with no evidence of harmful pathogenic organisms present. In addition, substantially similar results are obtained when other harmless bacterial organisms are utilized in place of the above-described Lactobacillus organisms.

The process is equally satisfactorily run when different runs utilize different species of the above-specified organisms. In all instances examination of any potential dead spots in the process reveal that the predominant organisms growing are harmless organisms generated from the original inoculant, and in each instance there are no detectable harmful pathogenic organisms.

The endosperm product was examined and found to comprise starch granules maintained in an intact, ungelatinized form and gluten in a dispersible and substantially undenatured state.

What is claimed is:

1. In a process of hydroprocessing wheat to obtain a wheat product free from husk, said process being of the type wherein wheat is immersed in an aqueous medium and ground or macerated so as to substantially completely disrupt the normal cellular structure of and disperse the endosperm, and wherein the component fractions are subsequently separated from said ground or macerated wheat, throughout said process substantially all of the starch granules being maintained in an intact, ungelatinized form and substantially all of the gluten protein being maintained in a dispersible form and essentially undenatured with respect to doughing function, the improvement which comprises the step of:

inoculating said aqueous medium with a nonpathogenic organism which is not deleterious to said wheat product or said process and which will grow under the conditions of said process, the organic density of said nonpathogenic organism being sufficient to seed the hydroprocessing system with said nonpathogenic organism and create conditions nonconducive to the growth of pathogenic organisms, thereby reducing the potential for growth of said pathogenic organisms in said system.

2. The method of claim 1, wherein said method is accomplished by alternately employing at least two different strains of non-pathogenic organisms.

3. The method of claim 1, wherein said non-pathogenic organism is selected from the genus Lactobacillus.

4. The method of claim 1, wherein said non-pathogenic organism is selected from the genus Lactobacillus and is selected from the species group consisting of *Lactobacillus lactis, bulgaricus, acidophilus, plantarum, brevis, debrueckii*, and *fermentum*.

5. The method of claim 1, wherein said non-pathogenic organism is *Lactobacillus fermentum*.

6. The method of claim 1, wherein the organism density of said non-pathogenic organisms within said hydroprocess is sufficient to insure that all dead spots within said system are seeded by said non-pathogenic organisms.

7. A method for hydroprocessing wheat to separate the endosperm from the husk and germ tissues, said method comprising the steps:

a. steeping 1 part by weight of wheat in at least 0.6 parts by weight of an aqueous acid steeping medium at temperatures ranging from 18° C. to about 45° C. until the grain has attained a moisture content of from about 41% to about 56% by weight of the hydrated grain, said steeping medium containing acid in concentration and quantity sufficient to maintain the pH of said steeping medium external of the grain between 1.2 and 5.0 and to reduce the internal pH of the hydrated grain to between 3.0 and 5.6, said steeping medium also containing an inoculant of a nonpathogenic organism which will regenerate itself under the conditions of steeping specified herein and which is not deleterious to the wheat product or process, the organism density of said nonpathogenic organism being sufficient to seed the hydroprocessing system with said nonpathogenic organism and thereby reduce the potential for growth of pathogenic organisms in said system;

b. macerating the hydrated grain to split the husk and expose the endosperm as a plastic mass while maintaining at least 90% by weight of the husk and the germ above a minimum dimension of 300 microns;

c. dispersing the macerated grain in an aqueous dispersing medium to a solids concentration of from 4% to about 30% and maintaining the pH of said dispersion between about 3.0 and 5.6; the dispersing shear being sufficient to disengage the endosperm from the husk and germ tissues; and, d. separating said dispersion into a particulate husk and germ fraction and an endosperm dispersion while maintaining throughout the process substantially all of the starch granules in an intact, ungelatinized form and maintaining substantially all of the gluten protein in a dispersible and substantially undenatured state with respect to doughing function.

8. The method of claim 7, wherein, during the dispersing step, at least 90% by weight of the husk and germ are maintained above a minimum dimension of 300 microns.

9. The method of claim 8, wherein, after steeping, the residual steeping medium is separated from the hydrated grain.

10. The method of claim 7, wherein the steeping medium contains an acid in concentration and quantity sufficient to maintain the pH of said steeping medium external of the grain between 1.5 and 4.5.

11. The method of claim 10, wherein, in the dispersing step, the pH of said dispersion is maintained at between 3.0 and 5.2.

12. The method of claim 11, wherein, after the separating step, a portion of the water is removed from said endosperm dispersion.

13. The process of claim 7, wherein the dissolved oxygen content within said processing system is maintained at less than 5% by volume.

14. The process of claim 13, wherein the dissolved oxygen content of said system is maintained at less than 3% by volume.

15. The process of claim 14, wherein the dissolved oxygen content of said system is maintained at less than 1% by volume.

16. The process of claim 7, wherein during steeping said process is inoculated with said organisms to achieve an organism density of at least $10^3$ organisms per gram of steep.

17. The process of claim 16, wherein the organism density is at least $10^5$ organisms per gram of steep.

18. The process of claim 17, wherein the organism density is at least $10^7$ organisms per gram of steep.

19. The process of claim 16, wherein the organism density is from 100,000 to about 900,000 per gram of steep.

20. The process of claim 7, wherein said steeping is conducted for a period of time of from about 12 hours to about 24 hours, and wherein said inoculant of said non-pathogenic organism is added to the steeping medium of step (a) after about one-half of the steeping time period has expired.

* * * * *